3,073,823
PRODUCTION OF CHLORINATED ISOCYANURIC ACID

Karl Merkel, Heinz-Ulrich Werner, and Albert Palm, Ludwigshafen (Rhine), Germany, assignors to Badische Anilin- & Soda-Fabrik Aktiengesellschaft, Ludwigshafen (Rhine), Germany
No Drawing. Filed Dec. 15, 1959, Ser. No. 859,587
Claims priority, application Germany Dec. 16, 1958
4 Claims. (Cl. 260—248)

This invention relates to an improved process for the production of chlorinated isocyanuric acid by allowing chlorine to act on an aqueous solution of an alkali cyanurate.

It is known to prepare trichlorisocyanuric acid by chlorination of an aqueous solution of the tripotassium salt of cyanuric acid at 0° C. When carrying out this process on a pilot-plant scale there is obtained in a yield of about 80% of the theory, a product consisting of trichlorisocyanuric acid and a considerable quantity of by-products. The period necessary for the reaction is relatively long and amounts to 5 to 6 hours even when the reactants are thoroughly mixed. The process may be illustrated by the following reaction scheme:

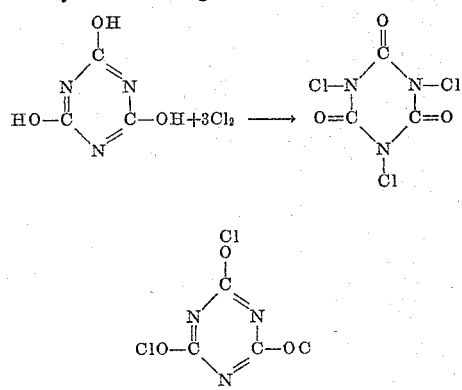

It is also known to allow an aqueous solution of an alkali salt of cyanuric acid to flow as a film over a cooled surface and to lead thereover at the same time a stream of gaseous chlorine while activating with light. This process is cumbersome and very difficult to apply on a large commercial scale. The process also has the disadvantage that explosive chlorine oxides may be formed and the yield is less than 60% of the theory.

It is an object of the present invention to provide a process for the production of chlorinated isocyanuric acid, whereby high yields are obtained.

Another object of the invention is the production of chlorinated isocyanuric acid free from impurities.

Still another object of the invention is to provide a process for the production of chlorinated isocyanuric acid, whereby the formation of explosive chlorine compounds is avoided.

A further object of the invention is to produce chlorinated cyanuric acid in less time than in prior art methods.

These and other objects and advantages of the invention are achieved by leading chlorine into an aqueous solution of an alkali salt of cyanuric acid until the solution has an acid reaction, adding an alkali compound capable of forming a salt with the cyanuric acid in an amount which is equivalent to at the most 30% of the cyanuric acid and discontinuing the addition of chlorine after the pH value of the solution has again fallen to 5 to 2.5.

For the preparation of dichlorisocyanuric acid it is preferable to start from an aqueous solution of the dialkali salts of cyanuric acid, and for the preparation of trichlorisocyanuric acid from an aqueous solution of the trialkali salts of cyanuric acid, of which the content of cyanurate is more than 5% and advantageously between 5 and 20%. More dilute solutions of alkali cyanurates may also be used. This has the consequence, however, that a large part of the end product remains dissolved in the mother liquor. It is also possible to prepare mixtures of di- and trichlorisocyanuric acid. For this purpose there are used mixtures of the di- and trialkali cyanurates as initial materials. For example for the preparation of a mixture of 50% of dichlorisocyanuric acid and 50% of trichlorisocyanuric acid, the starting material may be an alkali cyanurate containing 2.5 mols of alkali per mol of cyanuric acid, i.e. a mixture of 50% of dialkali cyanurate and 50% of trialkali cyanurate. The pH value of the alkali cyanurate solution is above 7, especially between 10 and 13. Chlorine gas is led into this solution. In order to avoid side reactions and to shorten the reaction period as much as possible, the liquid and gaseous phases must be intimately mixed during the reaction. During the chlorination a temperature below 100° C. is usually maintained; in the production of dichlorisocyanuric acid a temperature below 50° C. and in the production of the trichlorisocyanuric acid a temperature below 40° C. is often maintained. Temperatures between —10° and +35° C. are especially preferred. Upon leading in chlorine, the pH value of the solution falls. As soon as the solution has an acid reaction, i.e. a pH value below 7, preferably between 3 and 6, an inorganic alkali compound capable of forming a salt with cyanuric acid is added, for example an alkali hydroxide, carbonate or bicarbonate, preferably in aqueous solution. By the term "alkali compounds" we understand compounds of the metals sodium and potassium. The amount of alkali compound is chosen so that it is at the most 30%, and especially 1 to 25%, of the amount equivalent to the cyanuric acid. The addition of the alkali compound may be made all at once, or periodically, or continuously. The further addition of chlorine may be effected during or after the addition of the alkali compound, or alternately with the addition of the alkali compound. The reaction is ended when the pH value of the solution lies between 2.5 and 5. The reaction can be carried out under normal pressure or increased pressure. The solid crystalline chlorinated isocyanuric acid is separated mechanically from the aqueous solution. In order to avoid waste, the aqueous solution may be used for another reaction.

To avoid decomposition of the crude chlorinated isocyanuric acid, it is dried at temperatures below 100° C., for example at about 40° to 60° C., possibly in vacuo and preferably at pressures below about 50 mm. Hg. In order to obtain a chlorinated isocyanuric acid free from alkali chloride, the acid may be washed with water prior to drying. The washing water thus arising may be used again for dissolving the alkali salt of cyanuric acid. The chlorinated isocyanuric acid is obtained according to the present invention in the form of small white crystals. The yield is practically quantitative.

In so far as the chlorinated isocyanuric acid contains dichlorisocyanuric acid, it can be converted into the stable monoalkali salt which is readily soluble in water by reaction with alkali, for example 1 mol of alkali hydroxide per mol of dichlorisocyanuric acid, either in the aqueous phase or after drying.

The process may be carried out continuously or discontinuously. It is a considerable advantage of the process according to this invention that the reaction is concluded in a much shorter time than in the known methods. The reaction may also be carried out in the presence of solvents which are admixed to the aqueous phase. Examples of these are low boiling alcohols, such as methanol, ethanol, and also acetone, acrylonitrile, aliphatic and aromatic amines, phenols, urea and formaldehyde.

The following examples will further illustrate this invention but the invention is not restricted to these examples. The parts specified in the examples are parts by weight.

Example 1

In a reactor provided with a stirring device there are mixed together 384 parts of cyanuric acid, 360 parts of 98% caustic soda and 4000 parts of a 12.5% aqueous sodium chloride solution originating from a previous batch where it arises from the working up of crude trichlorisocyanuric acid. An aqueous solution of the trisodium salt of cyanuric acid is formed with the pH value 12.5. Into this solution 630 parts of gaseous chlorine are led in during an hour, the pH value thereby falling to 5.9. The temperature of the solution is kept at 0° C. Then 141 parts of a 20.8% aqueous sodium carbonate solution are added and another 110 parts of chlorine are led in during a period of 2 hours. Simultaneously with the chlorine, 140 parts of a 20.8% aqueous sodium carbonate solution are added. This solution is added within 1¾ hours and the addition of chlorine is continued for another quarter of an hour. The reaction solution then has the pH value 2.9. To expel unreacted chlorine, nitrogen is led through the reaction solution for half an hour. The trichloriscyanuric acid which is deposited in crystalline form is separated by means of a centrifuge and washed with water. The two aqueous solutions are used again for the next batch. The trichlorisocyanuric acid is then dried at room temperature.

680 parts of trichlorisocyanuric acid are obtained in the form of white crystals with a content of active chlorine of 90.9% (calculated as chlorine) which almost corresponds to the theory (91.5%). The yield is 98% of the theory.

Example 2

In a reactor provided with stirring means there are mixed together 584 parts of cyanuric acid, 360 parts of 98% caustic soda and 5000 parts of a 10% aqueous sodium chloride solution originating from a previous batch where it arises from the working up of crude dichlorisocyanuric acid. There is thus formed an aqueous solution of the disodium salt of cyanuric acid with the pH value 12. Into this solution gaseous chlorine is then led in an amount of 640 parts during an hour, the pH value falling to 3.5. The temperature of the solution is kept at 0° C. Then 100 parts of a 25% aqueous sodium carbonate solution are added and another 60 parts of chlorine are led in during a period of three-quarters of an hour. Simultaneously with the chlorine, 60 parts of a 25% aqueous sodium carbonate solution are added. This solution is added during half an hour and the chlorine addition is continued for a further quarter of an hour. The reaction solution then has the pH value 2.6. To expel unreacted chlorine, nitrogen is led through the reaction solution for half an hour. The dichlorisocyanuric acid is deposited in crystalline form, washed with water and then separated from the solution by means of a centrifuge. The two aqueous solutions thus obtained are used again for the next batch. The dichlorisocyanuric acid is then preliminarily dried at 40° C. and a pressure of 20 mm. Hg. There are obtained 894 parts of dichlorisocyanuric acid in the form of a white powder and a content of active chlorine of 71.6% (calculated as chlorine) which almost corresponds to the theory (71.7%). The yield is 99% of the theory.

What we claim is:

1. In a process for the production of chlorisocyanuric acids selected from the group consisting of di- and trichlorisocyanuric acid and mixtures thereof wherein chlorine is led into an aqueous solution of an alkali salt of cyanuric acid until an acid reaction is set up, the improvement which comprises adding to said solution with an acid reaction an alkali compound selected from the group consisting of sodium hydroxide, potassium hydroxide, sodium carbonate, potassium carbonate, sodium bicarbonate, potassium bicarbonate and mixtures thereof in an amount equivalent to from 1 to 30% of the cyanuric acid and discontinuing the addition of chlorine after the pH value of the solution has again fallen to 5 to 2.5.

2. An improved process as claimed in claim 1 wherein the alkali compound is added in an aqueous solution.

3. An improved process as claimed in claim 1 wherein for the production of pure trichlorisocyanuric acid there is used an aqueous solution containing 5 to 20% by weight of trialkali cyanurate.

4. An improved process as claimed in claim 1 wherein for the production of pure dichlorisocyanuric acid there is used an aqueous solution containing 5 to 20% by weight of dialkali cyanurate.

References Cited in the file of this patent

UNITED STATES PATENTS

| | | |
|---|---|---|
| 2,184,886 | Muskat et al. | Dec. 26, 1939 |
| 2,975,178 | Hugel et al. | Mar. 14, 1961 |

FOREIGN PATENTS

| | | |
|---|---|---|
| 565,256 | Canada | Oct. 28, 1958 |
| 1,149,758 | France | July 22, 1957 |
| 1,050,341 | Germany | Feb. 12, 1959 |

OTHER REFERENCES

Chenicek: Textile Research Journal, vol. 16, pp. 219–225 (1948).

UNITED STATES PATENT OFFICE
CERTIFICATE OF CORRECTION

Patent No. 3,073,823 January 15, 1963

Karl Merkel et al.

It is hereby certified that error appears in the above numbered patent requiring correction and that the said Letters Patent should read as corrected below.

Column 1, lines 34 to 41, in the formula, lower right hand portion thereof, for "C-OC" read -- C-OCl --.

Signed and sealed this 1st day of October 1963.

(SEAL)
Attest:

ERNEST W. SWIDER
Attesting Officer

DAVID L. LADD
Commissioner of Patents